United States Patent

[11] 3,586,264

[72] Inventors Edward S. Carter, Jr.
Fairfield;
Dean E. Cooper, Trumbull, both of, Conn.
[21] Appl. No. 774,127
[22] Filed Nov. 7, 1968
[45] Patented June 22, 1971
[73] Assignee United Aircraft Corporation
East Hartford, Conn.

[54] HIGH RESOLUTION CONTROL SYSTEM
10 Claims, 1 Drawing Fig.
[52] U.S. Cl. .................................................... 244/17.19,
91/363, 244/78
[51] Int. Cl. ..................................................... B64c 27/82
[50] Field of Search ............................................. 244/17.19,
17.13, 17.11, 83, 78, 77; 91/363; 318/20

[56] References Cited
UNITED STATES PATENTS
2,686,896 8/1954 Mathews ...................... 244/83 UX
3,008,670 11/1961 Guarino et al. ............... 244/17.13
3,195,838 7/1965 Bishop .......................... 244/78
3,390,614 7/1968 Tatum .......................... 91/363 X
3,452,645 7/1969 Barltrop ....................... 91/363
3,408,024 10/1968 Iverson ......................... 91/363 X
3,426,650 2/1969 Jenney .......................... 91/363 X Primary Examiner—Milton Buchler
Assistant Examiner—Paul E. Sauberer
Attorney—Shenier & O'Connor ABSTRACT: A high resolution control system for an aircraft, such as a helicopter, in which a mechanical system for translating motion from a manually operable input member to an output member at a remote location has a first mechanical input supplied directly by the input member and a second input supplied by an electrical system producing an error signal by comparing a first signal generated in response to displacement of the input member with a feedback signal generated in response to displacement of the output member. Where the output member is a helicopter tail rotor, means are provided for introducing rate-of-turn and collective pitch corrections into both the mechanical system and into the electrical system.

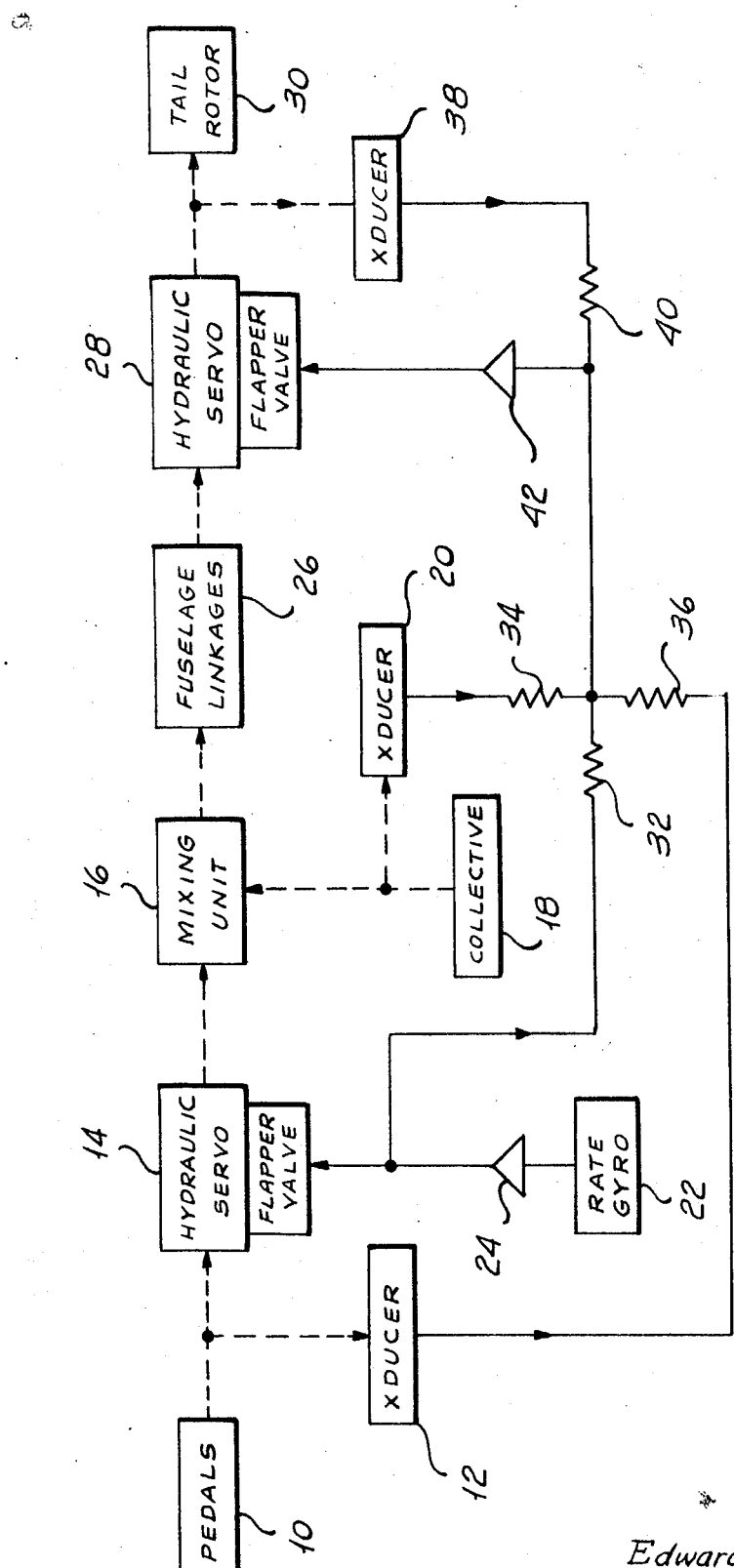

3,586,264

HIGH RESOLUTION CONTROL SYSTEM

BACKGROUND OF THE INVENTION

Heretofore known systems for moving an output member, such as the tail rotor of a helicopter, comprise a manually operable member driving a hydraulic servomotor which positions the output member. The arrangement is such that in the event of a malfunction of the servo, a direct mechanical connection is provided between the input and output members. In helicopter tail rotor control systems, there is a large amount of lost motion or backlash; and the correspondence between input and output is relatively low.

SUMMARY OF THE INVENTION

One object of our invention is to provide a high resolution control system which compensates for lost motion between an input member and an output member at a remote location.

Another object of our invention is to provide a high resolution control system which combines the sensitivity of an electrical control system with the safety of a mechanical system.

Other and further objects of our invention will appear from the following description.

BRIEF DESCRIPTION OF THE DRAWING

The accompanying drawing, which forms part of the instant specification and is to be read in conjunction therewith, is a schematic view of our high resolution control system applied to the yaw channel of a helicopter.

DESCRIPTION OF THE PREFERRED EMBODIMENT

Referring now to the drawing, in which we have shown our high resolution control system applied to the yaw channel of a helicopter for controlling the pitch of the tail rotor, pilot-operated pedals 10 drive the input of a hydraulic servomotor 14 and a pedal position transducer 12. Servo 14 is of the dual input type, such as is shown in Riley et al. U.S. Pat. No. 3,256,780 and includes an electrically controlled flapper valve which positions the servo output shaft independently of motion of the pilot's pedals 10. In essence, hydraulic servo 14 operates as a summing device having both mechanical and electrical inputs. The output shaft of servo 14 is coupled to a mixing unit 16, the construction of which is shown in detail in Dean et al. U.S. Pat. No. 3,199,601. Mixing unit 16 is provided with a further input from the collective pitch control 18 of the helicopter. The collective stick 18 also drives a position transducer 20. As is well known to the art, changes in the position of the collective control produce changes in the main rotor pitch which necessitate variations in the power output of the engine in order to maintain rotor speed constant. Variations in engine torque are compensated by introducing motion of the collective stick 18 into the yaw channel to produce a corresponding change in tail rotor pitch. Mixing unit 16 is essentially a mechanical summing device.

The output of mixing unit 16 is coupled through linkages 26 which extend from adjacent the main rotor to the extreme tail of the helicopter. Because of the great lengths of shafting and because of inherent lost lotion in the mixing unit, there is considerable backlash in the tail rotor control system. The fuselage linkages 26 drive a further dual input hydraulic servo 28, which may be of a construction similar to 14 and is provided with an electrically controlled flapper valve input. The output of servo 28 controls the pitch of the tail rotor 30 and drives a position transducer 38.

The output of a rate-of-turn gyroscope 22 is coupled to a buffer amplifier 24, the output of which drives the electrically controlled flapper valve of servomotor 14. The outputs of transducers 12 and 20 and of buffer amplifier 24 are coupled through respective summing resistors 36, 34, and 32 to the input of a high-gain amplifier 42. The output of transducer 38 is coupled through a feedback resistor 40 to the input of amplifier 42. The output of amplifier 42 drives the electrically controlled flapper valve of hydraulic servomotor 28.

In operation of our invention, movements of the pilot's pedals 10 are coupled through servo 14, mixing unit 16, fuselage linkages 26, and hydraulic servo 28 to operate tail rotor 30. In the absence of pilot-induced motion of the pedals, rate gyro 22 produces output signals which tend to maintain the craft on its existing heading. The output signals of rate gyro 22 are coupled to buffer amplifier 24 to operate the flapper valve of servo 14. This produces a change in the position of the output shaft of servo 14 which is coupled through mixing unit 16, fuselage linkages 26, and servomotor 28 to operate tail rotor 30. Motion of the collective stick 18 is applied to mixing unit 16 where it is coupled through the fuselage linkages and servomotor 28 to actuate the tail rotor 30.

It is desired that the tail rotor be positioned in accordance with a summation of the position of pedals 10, the output of rate gyro 22, and the position of the collective stick 18. However, because of inherent backlash in the various mechanical components, especially in the fuselage linkages, the lost motion in the system may be as much as 10 percent of the total range of motion. The auxiliary electrical input to the flapper valve of servo 28 operated to remove substantially all lost motion and backlash from the tail rotor control system. The outputs of transducers 12 and 20 comprise electrical analogues of the position of pedals 10 and of the position of the collective stick 18. The output of buffer amplifier 24 is an electrical analogue of the motion of the flapper value of servomotor 14 and hence of the change in position of the output shaft of servomotor 14 as a result of such motion of the flapper valve. The three electrical analogues are coupled through summing resistors 32, 34, and 36 for comparison with the output of transducer 38 which is an electrical analogue of the position of the tail rotor. If any lack of correspondence exists due to lost motion or backlash, an error signal is applied to amplifier 42 which drives the flapper valve of servomotor 28, thus changing the position of tail rotor 30 and the output signal of transducer 38. The system nulls when the feedback current through resistor 40 is equal to the sum of the input currents through summing resistors 32, 34, and 36. When correspondence is thus reached between the electrical analogues, it follows that there must exist a precise correspondence between the mechanical quantities from which these analogues were derived. Accordingly, the tail rotor is driven to a position which precisely corresponds to the sum of the position of pedals 10, the position of collective stick 18, and the output of rate gyro 22. While our system thus operates to produce substantially perfect correspondence between the mechanical inputs at the control station and the mechanical output at the remote tail rotor, it preserves the safety of a purely mechanical system, in that if a failure of the electrical system occurs the pilot still has direct mechanical control of the tail rotor.

It will be seen that we have accomplished the objects of our invention. We have provided a high resolution control system which substantially eliminates mechanical backlash or lost motion between input and output members. Our system combines the precision of an electrical control with the safety of a mechanical control.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what We claim is;

1. A control system including in combination a first dual input device having a first mechanical input and a second input and providing a mechanical output in accordance with a summation of the first and second inputs, a first movable member, means coupling the first member to the first input, means comprising a position transducer responsive to movement of the member for providing a first signal, means comprising a position transducer responsive to the mechanical output for providing a feedback signal, means for comparing the first and feedback signals, and means coupling the comparing means to the second input.

2. A system as in claim 1 wherein the dual input device comprises a hydraulic servomotor provided with an electrically controlled valve.

3. A system as in claim 1 which further includes a second movable member, means coupling the second member to the first input, means responsive to movement of the second member for providing a second signal, and means coupling the second signal to the comparing means.

4. A system as in claim 3 wherein the means coupling the first and second members to the first input comprises a mechanical summing device.

5. A system as in claim 1 wherein the means coupling the first member to the first input comprises a second dual input device having a mechanical input and an electrical input and providing a mechanical output in accordance with a summation of its inputs, the system further including means for providing a second signal, and means coupling the second signal to the electrical input and to the comparing means.

6. A control system including in combination a first movable member, a movable output member, means comprising a position transducer responsive to movement of the first member for providing a first signal, means comprising a position transducer responsive to movement of the output member for providing a feedback signal, means for comparing the first and feedback signals to provide an output signal, and means responsive both to movement of the first member and to the output signal for positioning the output member.

7. A system as in claim 6 which further includes a second movable member, means responsive to movement of the second member for providing a second signal, and means coupling the second signal to the comparing means, wherein the positioning means comprises means responsive to movement of the first member and to movement of the second member and to the output signal.

8. A system as in claim 6 which further includes means for providing a second signal and means coupling the second signal to the comparing means, wherein the positioning means comprises means responsive to movement of the first member and to the second signal and to the output signal.

9. A control system, including in combination means providing two control inputs, a first summing device having two inputs and providing a first output, a second summing device having three inputs and providing a second output, a comparator providing a third output, means coupling the control inputs to the inputs of the first device, means coupling the first and second outputs to the comparator, and means coupling the control inputs and the third output to the inputs of the second device.

10. A control system including in combination a movable input member, means responsive to movement of the input member for positioning an output member, means comprising a position transducer responsive to movement of the input member for providing a first signal, means comprising a position transducer responsive to the output member for providing a feedback signal, means for comparing the first and feedback signals, and means responsive to the comparing means for adjusting the position of the output member.